US008805191B2

(12) United States Patent
Ho et al.

(10) Patent No.: US 8,805,191 B2
(45) Date of Patent: Aug. 12, 2014

(54) OPTICAL TRANSCEIVER INCLUDING OPTICAL FIBER COUPLING ASSEMBLY TO INCREASE USABLE CHANNEL WAVELENGTHS

(75) Inventors: I-Lung Ho, Sugar Land, TX (US); Jun Zheng, Houston, TX (US); Chong Wang, Stafford, TX (US)

(73) Assignee: Applied Optoelectronics, Inc., Sugar Land, TX (US)

( * ) Notice: Subject to any disclaimer, the term of this patent is extended or adjusted under 35 U.S.C. 154(b) by 489 days.

(21) Appl. No.: 13/248,424

(22) Filed: Sep. 29, 2011

(65) Prior Publication Data

US 2013/0084070 A1 Apr. 4, 2013

(51) Int. Cl.
*G02B 6/26* (2006.01)
(52) U.S. Cl.
USPC ............................. 398/128; 398/129; 398/88
(58) Field of Classification Search
USPC ............................................ 398/128, 129, 88
See application file for complete search history.

(56) References Cited

U.S. PATENT DOCUMENTS

| 5,917,626 | A | * | 6/1999 | Lee ................................. | 398/88 |
| 6,084,994 | A | * | 7/2000 | Li et al. ......................... | 385/31 |
| 6,246,813 | B1 | * | 6/2001 | Zheng ............................ | 385/34 |
| 6,722,793 | B2 | * | 4/2004 | Althaus et al. ................. | 385/92 |

OTHER PUBLICATIONS

Masuko, Koichiro, Ori, Teijiro, Tanaka, Takayuki, and Inoue, Minako, "A Low Cost PON Transceiver Using Single TO-CAN Type micro-BOSA", Electronic Components and Technology Conference, 2006, pp. 1082-1086.

Kihara, Toshiaki, Suzuki, Michio, Shiozaki, Manabu, Yoshida, Kyohiro, Matsumura, Yutaka, Nakanishi, Hiromi and Yoshimura, Manabu, "Development of Single-Package 1.3/1.49 μm Bi-directional Device", SEI Technical Review, Oct. 2008, No. 67, pp. 33-38.

* cited by examiner

*Primary Examiner* — Danny Leung
(74) *Attorney, Agent, or Firm* — Grossman Tucker Perreault & Pfleger, PLLC; Norman S. Kinsella

(57) ABSTRACT

An optical transceiver may include an optical fiber coupling assembly for coupling optical fibers to transmitter and receiver sub-assemblies to increase the number of usable channel wavelengths by reducing an incident angle on a WDM filter without causing unwanted back reflection to a laser. In one example, the optical fiber coupling assembly may be used to increase the number of usable channel wavelengths between the L-band and the C-band. The optical transceiver may be used, for example, in an optical line terminal (OLT) and/or optical networking unit (ONU) in a wavelength division multiplexed (WDM) passive optical network (PON) capable of transmitting and receiving optical signals on multiple channel wavelengths.

20 Claims, 3 Drawing Sheets

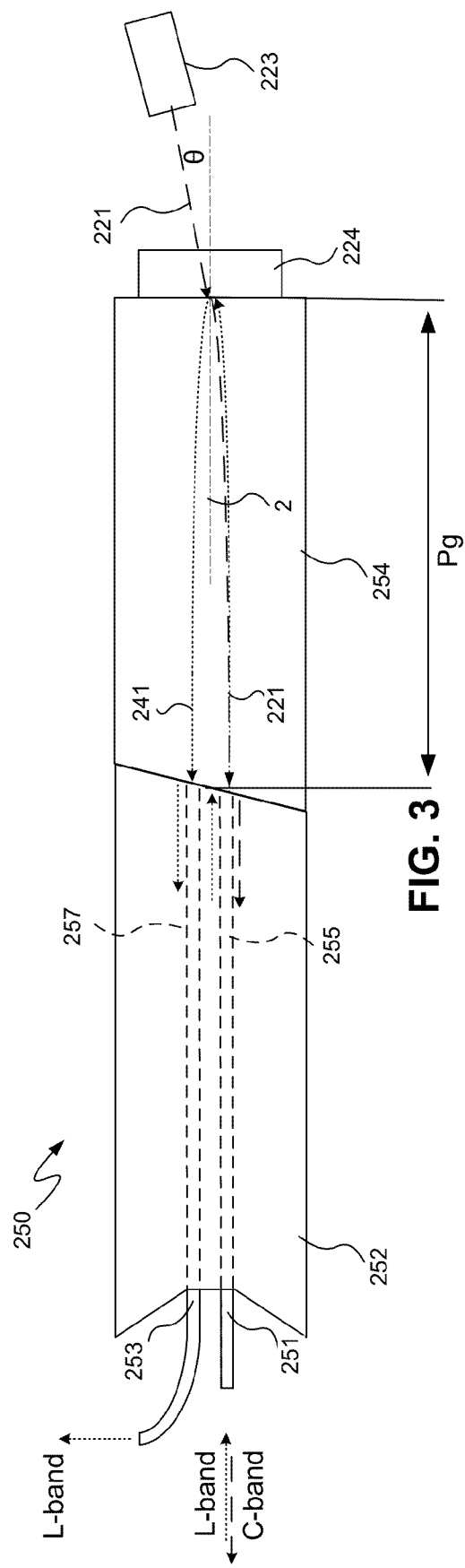
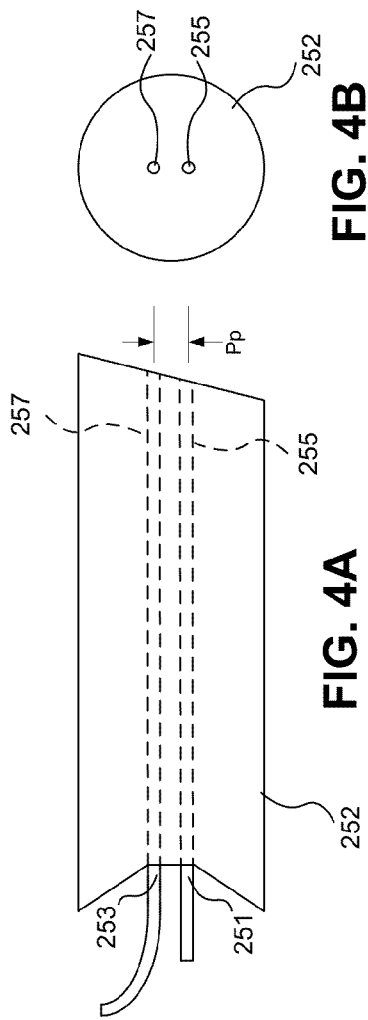
FIG. 3
FIG. 4A
FIG. 4B

OPTICAL TRANSCEIVER INCLUDING OPTICAL FIBER COUPLING ASSEMBLY TO INCREASE USABLE CHANNEL WAVELENGTHS

TECHNICAL FIELD

The present invention relates to optical transceivers and more particularly, to an optical transceiver including an optical fiber coupling assembly to increase usable channel wavelengths.

BACKGROUND INFORMATION

In optical communications systems or networks, multiple optical signals may be transmitted and received at different channel wavelengths using wavelength division multiplexing (WDM) techniques. The optical communications system or network may include optical transceivers capable of transmitting and receiving optical signals at different channel wavelengths over a single optical fiber. An optical transceiver may include transmitter and receiver sub-assemblies and a WDM filter that separates the wavelength(s) being transmitted by the transmitter sub-assembly from the wavelength(s) being received by the receiver sub-assembly. In a passive optical network (PON), for example, an optical transceiver may transmit optical signals at wavelengths in the C-band and may receive optical signals at wavelengths in the L-band. Standard C-band and L-band optical transmissions, for example, are capable of providing optical signals on 32 different channels.

Some developing WDM-PON systems are designed to use more than the 32 channels used in standard C-band and L-band transmissions. The number of channels may be increased by reducing the unusable wavelengths between the C-band and L-band (e.g., <10 nm) and adding usable channel wavelengths. One way to decrease the unusable wavelengths is to decrease an angle of incident light on the WDM filter relative to a normal line. Reducing the incident light angle, however, may result in reflection back to the transceiver laser, which may adversely affect performance. Existing transceivers have used 45 degree WDM filters in an effort to reduce the incident angle while preventing unwanted back reflection; however, such transceivers may not sufficiently reduce the unusable wavelengths without significantly increasing the cost.

BRIEF DESCRIPTION OF THE DRAWINGS

These and other features and advantages will be better understood by reading the following detailed description, taken together with the drawings wherein:

FIG. 3 is a schematic diagram of an optical fiber coupling assembly to increase usable channel wavelengths in an optical transceiver by reducing an incident angle on a WDM filter, consistent with embodiments of the present invention.

FIG. 4A is a schematic side view of a dual core fiber pigtail used in the optical fiber coupling assembly shown in FIG. 3.

FIG. 4B is a schematic end view of the dual core fiber pigtail shown in FIG. 4A.

DETAILED DESCRIPTION

An optical transceiver may include an optical fiber coupling assembly, consistent with embodiments described herein, for coupling optical fibers to transmitter and receiver sub-assemblies to increase the number of usable channel wavelengths by reducing an incident angle on a WDM filter without causing unwanted back reflection to a laser. In one example, the optical fiber coupling assembly may be used to increase the number of usable channel wavelengths between the L-band and the C-band. The optical transceiver may be used, for example, in an optical line terminal (OLT) and/or optical networking unit (ONU) in a wavelength division multiplexed (WDM) passive optical network (PON) capable of transmitting and receiving optical signals on multiple channel wavelengths.

As used herein, channel wavelengths refer to the wavelengths associated with multiple optical channels and may include a range of wavelengths centered on a carrier wavelength associated with a channel. The term "back reflection" refers to light reflected back to a laser and causing feedback that interferes with operation of the laser. The term "coupled" as used herein refers to any connection, coupling, link or the like by which signals carried by one system element are imparted to the "coupled" element. Such "coupled" devices are not necessarily directly connected to one another and may be separated by intermediate components or devices that may manipulate or modify such signals.

Figure 1:
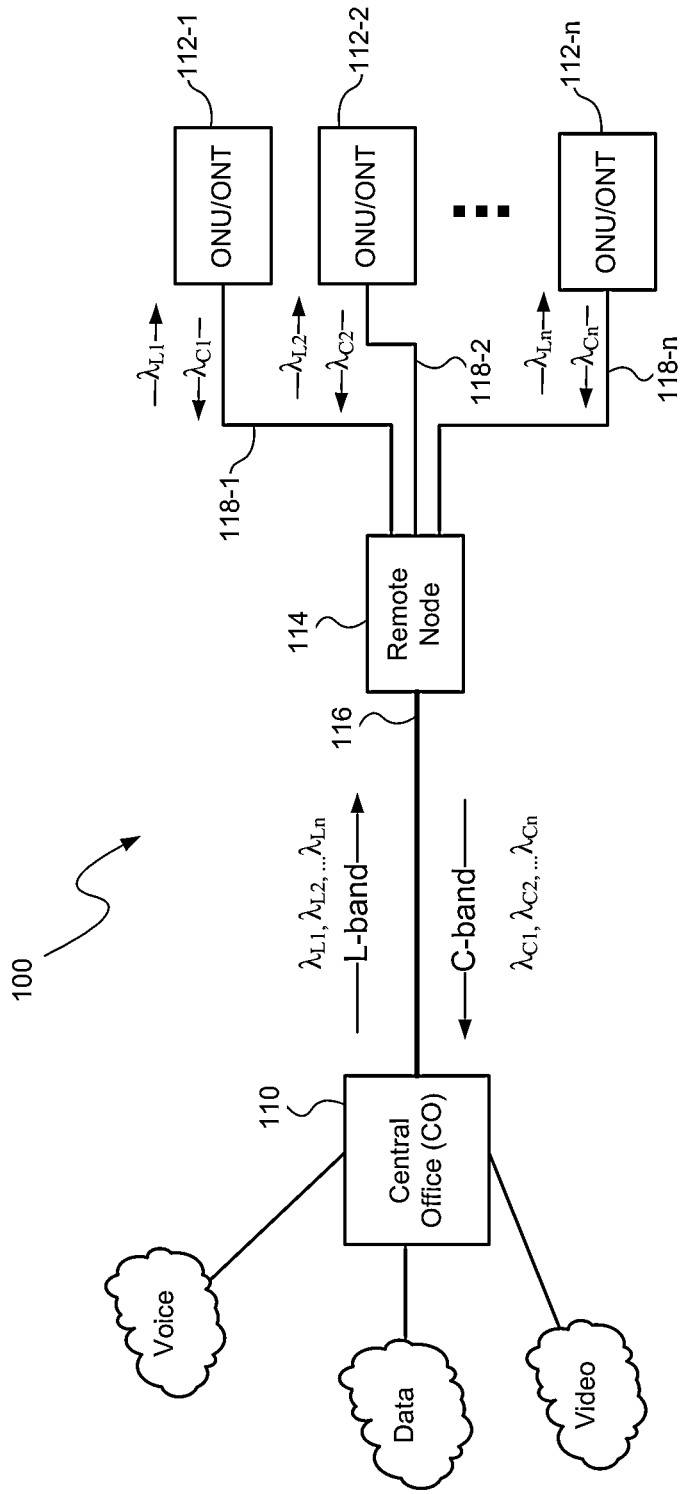
FIG. 1 is a functional block diagram of an optical network with terminals including transceivers, consistent with embodiments of the present invention.

Referring to FIG. 1, an optical transceiver, consistent with embodiments of the present invention, may be used with a WDM-PON 100. According to one embodiment of the WDM-PON 100, a central office (CO) 110 may be coupled to a plurality of ONUs/ONTs 112-1 to 112-$n$ via optical waveguides or fibers 116, 118-1 to 118-$n$ and a passive remote node 114. The ONUs/ONTs 112-1 to 112-$n$ may be located in a home, business or other type of location or premises. The WDM-PON 100 may also include additional nodes or network devices, such as Ethernet PON (EPON) or Gigabit PON (GPON) nodes or devices, coupled between the remote node 114 and ONUs/ONTs at different locations or premises. One application of the WDM-PON 100 is to provide fiber-to-the-home (FTTH) or fiber-to-the-premises (FTTP) capable of delivering voice, data, and video services across a common platform. In this application, the CO 110 may be coupled to one or more sources or networks providing the voice, data and/or video.

In the WDM-PON 100, different ONUs/ONTs 112-1 to 112-$n$ may be assigned different channel wavelengths and optical signals may be transmitted on the different channel wavelengths and combined and separated using WDM techniques. In one embodiment, the WDM-PON 100 may use different wavelength bands for transmission of downstream and upstream optical signals. For example, the L-band (e.g., about 1565 to 1625 nm) may be used for downstream transmissions and the C-band (e.g., about 1530 to 1565 nm) may be used for upstream transmissions. Other wavelengths and wavelength bands are also within the scope of the system and method described herein.

The ONUs/ONTs 112-1 to 112-$n$ may be assigned different channel wavelengths within the L-band and within the C-band. Transceivers located within the ONUs/ONTs 112-1 to 112-$n$ may thus be configured to transmit an optical signal on at least one channel wavelength in the C-band and to receive an optical signal on at least one channel wavelength in the L-band. The remote node 114 splits the downstream aggregate WDM optical signal (e.g., $\lambda_{L1}, \lambda_{L2}, \ldots \lambda_{Ln}$) from the CO 110 for transmission to the respective ONUs/ONTs 112-1 to 112-$n$ and combines the upstream optical signals (e.g., $\lambda_{C1}, \lambda_{C2}, \ldots \lambda_{Cn}$) from the respective ONUs/ONTs 112-1 to 112-$n$ for transmission to the CO 110 as an aggregate WDM optical signal.

Figure 2:
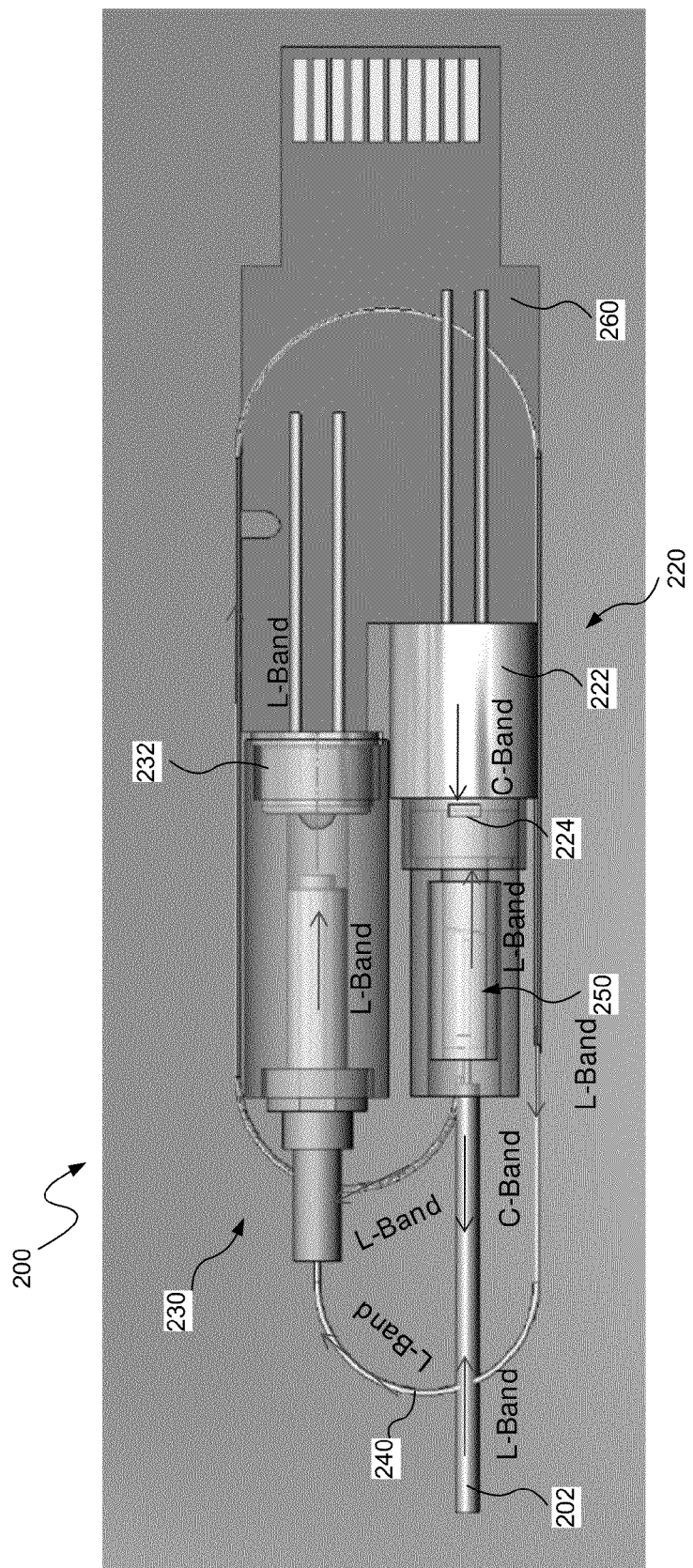
FIG. 2 is a schematic diagram of a transceiver including transmitter and receiver sub-assemblies and an optical fiber coupling assembly, consistent with embodiments of the present invention.

Referring to FIG. 2, one embodiment of a transceiver 200 coupled to an optical fiber 202 for transmitting and receiving optical signals is described in greater detail. The transceiver 200 may include a transmitter sub-assembly 220 for transmitting optical signals in the C-band, a receiver sub-assembly 230 for receiving optical signals in the L-band, and an internal optical fiber 240 coupling the transmitter sub-assembly 220 to the receiver sub-assembly 230. The optical fibers 202, 240 may be coupled to the transmitter sub-assembly 220 using an optical fiber coupling assembly 250 that increases the usable optical channel wavelengths, as will be described in greater detail below. The transceiver 200 may also include other optical or electronic sub-assemblies, modules or components. In one embodiment, the transceiver 200 is an SFP transceiver compatible with a small form-factor pluggable (SFP) standard.

The transmitter sub-assembly 220 may include a laser module 222 and a WDM filter 224. The laser module 222 may be a TO can laser package including a laser diode, such as distributed feedback (DFB) laser or a Fabry-Perot (FP) laser. The WDM filter 224 may be a thin film filter capable of passing certain wavelengths (e.g., in the C-band) and reflecting other wavelengths (e.g., in the L-band). The receiver sub-assembly 230 may include an optical detector module 232 including a photodetector, such as an avalanche photodiode (APD) with a trans-impedance amplifier (TIA) or other type of photodiode. The transceiver 200 may also include a circuit board 260 with circuitry coupled to the laser module 222 and the optical detector module 232.

In one embodiment, the optical fiber 202 carries optical signals in both the C-band and L-band between the transceiver 200 and a WDM-PON. The internal optical fiber 240 carries the received optical signals in the L-band from the transmitter sub-assembly 220 to the receiver sub-assembly 230. The optical fiber coupling assembly 250 directs the transmitted optical signals in the C-band to the optical fiber 202 and directs the received, reflected optical signals in the L-band to the optical fiber 240. The optical signals in the C-band are passed from the laser package 222 through the WDM module 224 to the optical fiber 202 through a common port of the optical fiber coupling assembly 250. The optical signals in the L-band are received from the optical fiber 202 and reflected by the WDM module 224 through a reflector port of the optical fiber coupling assembly 226 to the receiver sub-assembly 230 via the internal optical fiber 240 for detection by the optical detector module 232.

As shown in greater detail in FIG. 3, the optical fiber coupling assembly 250, consistent with embodiments described herein, may include a dual core fiber pigtail 252 optically coupled to a gradient index (GRIN) lens 254. The dual core fiber pigtail 252 optically couples two optical fibers (e.g., fibers 202, 240) to the WDM filter 224 via the GRIN lens 254. A transceiver laser 223 is optically coupled to the optical fiber 202 via the WDM filter 224, the GRIN lens 254, and the dual core fiber pigtail 252. The dual core fiber pigtail 252 includes a common port 251 for coupling to the optical fiber 202 carrying both the C-band and L-band channel wavelengths and a reflect port 253 for coupling to the optical fiber 240 carrying the L-band channel wavelengths. As shown in greater detail in FIGS. 4A and 4B, the dual core fiber pigtail 252 provides a spacing or pitch $P_p$ between optical fiber cores 255, 257, which are optically coupled to the GRIN lens 254.

The GRIN lens 254 also has a pitch $P_g$, which corresponds to a length of the GRIN lens 254 as a portion of a total length of 1 period.

In the illustrated embodiment, the WDM filter 224 is configured to pass laser light 221 in the C-band and to reflect laser light 241 in the L-band. The laser light 221 emitted from the laser 223 in the C-band passes through the WDM filter 224 and is bent by the GRIN lens 254 to the optical fiber core 255 and passes out the common port 251 of the dual core fiber pigtail 252. The laser 223 directs the laser light 221 at an incident angle $\theta$ relative to an axis 2 normal to the WDM filter 224 such that wavelengths outside of the C-band are reflected by the WDM filter 224 away from the laser 223 with minimal or no back reflection. The laser light 241 in the L-band received from the common port 251 is bent by the GRIN lens 254 such that the light 241 is reflected by the WDM filter 224 at the same incident angle $\theta$. The reflected light 241 is bent by the GRIN lens 254 to the optical fiber core 257 and passes out the reflect port 253.

The GRIN lens 254 bends the laser light 221, 241 such that both the light 221 emitted from the laser 223 and the light 241 received from the common port 251 form the incident angle $\theta$ with the normal line or axis 2 of the WDM filter 224. The incident angle $\theta$ may be controlled by the pitch $P_p$ of the dual core fiber pigtail 252 and the pitch $P_g$ of the GRIN lens 254. In particular, a greater pitch $P_p$ of the dual core fiber pigtail 252 (or wider spacing of the fiber cores 255, 257) increases the incident angle $\theta$ and a greater pitch $P_g$ of the GRIN lens 254 decreases the incident angle $\theta$. In one embodiment, an incident angle $\theta$ in the range of about 3 to 4.5° results in a desired range of usable channel wavelengths in the L-band and the C-band without resulting in unwanted back reflection to the laser 223. To achieve the desired incident angle in the range of about 3 to 4.5°, for example, the pitch $P_p$ of the optical fiber pigtail 322 may be in a range of about 170 to 250 µm and the pitch $P_g$ of the GRIN lens 324 may be in a range of about 0.21 to 0.25.

Accordingly, an optical fiber coupling assembly, consistent with embodiments described herein, is capable of coupling optical fibers to transmitter and receiver sub-assemblies in an optical transceiver with reduced incident light angles on a WDM filter without causing significant back reflection. The reduced incident light angles allow the transceiver to transmit and receive at an increased number of channels in the C-band and L-band.

Consistent with one embodiment, an optical fiber coupling assembly includes a dual core optical fiber pigtail for coupling at least first and second optical fibers to an optical sub-assembly. The dual core optical fiber pigtail includes first and second optical fiber cores spaced with a predefined pitch. The first optical fiber and the first optical fiber core are configured to carry light within a C-band wavelength range and an L-band wavelength range, and the second optical fiber and the second optical fiber core are configured to carry light within the L-band wavelength range. The optical fiber coupling assembly also includes a gradient index (GRIN) lens optically coupled to the optical fiber cores. The GRIN lens is configured to bend light passing through the GRIN lens. The optical fiber coupling assembly further includes a wavelength division multiplexing (WDM) filter optically coupled to the GRIN lens. The WDM filter is configured to pass light in the C-band wavelength range and to reflect light in the L-band wavelength range. The WDM filter is optically coupled to the GRIN lens such that the light in the L-band wavelength range passing from the first optical fiber core through the GRIN lens is incident on the WDM filter at an incident angle allowing the light in the L-band wavelength range to reflect to the second optical fiber core. The WDM filter is also optically coupled to a transmitting laser such that light is directed from the laser at the incident angle allowing the light in the C-band wavelength range to pass through the GRIN lens to the first optical fiber core and preventing back reflection of the laser light outside of the C-band wavelength range.

Consistent with another embodiment, an optical transceiver includes an optical fiber coupling assembly, a transmitter sub-assembly, and a receiver sub-assembly. The transmitter sub-assembly includes a laser for emitting laser light in the C-band wavelength range. The laser is positioned such that the laser light is directed at the incident angle to the WDM filter allowing the laser light in the C-band wavelength range to pass through the WDM filter, through the GRIN lens and into the first optical fiber core, and wherein the incident angle of the laser light on the WDM filter prevents back reflection of the laser light outside of the C-band wavelength range. The receiver sub-assembly includes a photodetector for detecting light in the L-band wavelength range. The photodetector is coupled to the second optical fiber such that the laser light in the L-band wavelength range reflecting off of the WDM filter passes through the GRIN lens and into the second optical fiber core and the second optical fiber and is received by the photodetector.

Consistent with a further embodiment, a WDM-PON includes a plurality of terminals associated with different respective channel wavelengths and configured to transmit and receive optical signals on the different respective channel wavelengths. At least one of the plurality of terminals includes an optical transceiver including an optical fiber coupling assembly.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. An optical fiber coupling assembly comprising:
    a dual core optical fiber pigtail for coupling at least first and second optical fibers to an optical sub-assembly, wherein the dual core optical fiber pigtail includes first and second optical fiber cores spaced with a predefined pitch, wherein the first optical fiber and the first optical fiber core are configured to carry light within a C-band wavelength range and an L-band wavelength range, and wherein the second optical fiber and the second optical fiber core are configured to carry light within the L-band wavelength range;
    a gradient index (GRIN) lens optically coupled to the optical fiber cores, wherein the GRIN lens is configured to bend light passing through the GRIN lens; and
    a wavelength division multiplexing (WDM) filter optically coupled to the GRIN lens, wherein the WDM filter is configured to pass light in the C-band wavelength range and to reflect light in the L-band wavelength range, wherein the WDM filter is optically coupled to the GRIN lens such that the light in the L-band wavelength range passing from the first optical fiber core through the GRIN lens is incident on the WDM filter at an incident angle allowing the light in the L-band wavelength range to reflect to the second optical fiber core, and wherein the WDM filter is optically coupled to a transmitting laser such that light is directed from the laser at the incident angle allowing the light in the C-band wavelength range to pass through the GRIN lens to the first optical fiber core and preventing back reflection of the laser light outside of the C-band wavelength range.

2. The optical fiber coupling assembly of claim 1 wherein the incident angle is in a range of about 3 to 4.5 degrees.

3. The optical fiber coupling assembly of claim 1 wherein the predefine pitch of the dual core optical fiber pigtail is in a range of about 170 to 250 µm.

4. The optical fiber coupling assembly of claim 1 wherein the predefine pitch of the dual core optical fiber pigtail is greater than 125 µm.

5. The optical fiber coupling assembly of claim 3 wherein the GRIN lens has a pitch in a range of about 0.21 to 0.25.

6. The optical fiber coupling assembly of claim 4 wherein the GRIN lens has a pitch in a range of about 0.21 to 0.25.

7. The optical fiber coupling assembly of claim 1 wherein an unusable wavelength range between the C-band wavelength range passed by the WDM filter and the L-band wavelength range reflected by the WDM filter is less than 10 nm.

8. An optical transceiver comprising:
    a dual core optical fiber pigtail for coupling at least first and second optical fibers to an optical sub-assembly, wherein the dual core optical fiber pigtail includes first and second optical fiber cores spaced with a predefined pitch, wherein the first optical fiber and the first optical fiber core are configured to carry light within a C-band wavelength range and an L-band wavelength range, and wherein the second optical fiber and the second optical fiber core are configured to carry light within the L-band wavelength range;
    a gradient index (GRIN) lens optically coupled to the optical fiber cores, wherein the GRIN lens is configured to bend light passing through the GRIN lens; and
    a wavelength division multiplexing (WDM) filter optically coupled to the GRIN lens, wherein the WDM filter is configured to pass light in the C-band wavelength range and to reflect light in the L-band wavelength range, wherein the WDM filter is optically coupled to the GRIN lens such that the light in the L-band wavelength range passing from the first optical fiber core through the GRIN lens is incident on the WDM filter at an incident angle allowing the light in the L-band wavelength to reflect back to the second optical fiber core;
    a transmitter sub-assembly including a laser for emitting laser light in the C-band wavelength range, wherein the laser is positioned such that the laser light is directed at the incident angle to the WDM filter allowing the laser light in the C-band wavelength range to pass through the WDM filter, through the GRIN lens and into the first optical fiber core, and wherein the incident angle of the laser light on the WDM filter prevents back reflection of the laser light outside of the C-band wavelength range; and
    a receiver sub-assembly including a photodetector for detecting light in the L-band wavelength range, wherein the photodetector is coupled to the second optical fiber such that the laser light in the L-band wavelength range reflecting off of the WDM filter passes through the GRIN lens and into the second optical fiber core and the second optical fiber and is received by the photodetector.

9. The optical transceiver of claim 8 wherein the incident angle is in a range of about 3 to 4.5 degrees.

10. The optical transceiver of claim 8 wherein the predefine pitch of the dual core optical fiber pigtail is in a range of about 170 to 250 µm.

11. The optical transceiver of claim 8 wherein the predefine pitch of the dual core optical fiber pigtail is greater than 125 μm.

12. The optical transceiver of claim 8 wherein the GRIN lens has a pitch in a range of about 0.21 to 0.25.

13. The optical transceiver of claim 8 wherein an unusable wavelength range between the C-band wavelength range passed by the WDM filter and the L-band wavelength range reflected by the WDM filter is less than 10 nm.

14. The optical transceiver of claim 10 wherein the transmitter and receiver sub-assemblies are configured to transmit and receive optical signals on more than 32 channels in both the C-band wavelength range and the L-band wavelength range.

15. A wavelength division multiplexed (WDM) passive optical network (PON) comprising:
a plurality of terminals associated with different respective channel wavelengths and configured to transmit and receive optical signals on the different respective channel wavelengths, at least one of the plurality of terminals including an optical transceiver comprising:
a dual core optical fiber pigtail for coupling at least first and second optical fibers to an optical sub-assembly, wherein the dual core optical fiber pigtail includes first and second optical fiber cores spaced with a predefined pitch, wherein the first optical fiber and the first optical fiber core are configured to carry light within a C-band wavelength range and an L-band wavelength range, and wherein the second optical fiber and the second optical fiber core are configured to carry light within the L-band wavelength range;
a gradient index (GRIN) lens optically coupled to the optical fiber cores, wherein the GRIN lens is configured to bend light passing through the GRIN lens; and
a wavelength division multiplexing (WDM) filter optically coupled to the GRIN lens, wherein the WDM filter is configured to pass light in the C-band wavelength range and to reflect light in the L-band wavelength range, wherein the WDM filter is optically coupled to the GRIN lens such that the light in the L-band wavelength range passing from the first optical fiber core through the GRIN lens is incident on the WDM filter at an incident angle allowing the light in the L-band wavelength to reflect back to the second optical fiber core;
a transmitter sub-assembly including a laser for emitting laser light in the C-band wavelength range, wherein the laser is positioned such that the laser light is directed at the incident angle to the WDM filter allowing the laser light in the C-band wavelength range to pass through the WDM filter, through the GRIN lens and into the first optical fiber core, and wherein the incident angle of the laser light on the WDM filter prevents back reflection of the laser light outside of the C-band wavelength range; and
a receiver sub-assembly including a photodetector for detecting light in the L-band wavelength range, wherein the photodetector is coupled to the second optical fiber such that the laser light in the L-band wavelength range reflecting off of the WDM filter passes through the GRIN lens and into the second optical fiber core and the second optical fiber and is received by the photodetector.

16. The WDM-PON of claim 15 comprising:
at least one central office configured to transmit and receive aggregate WDM optical signals including the channel wavelengths; and
at least one remote node coupled between the central office and the plurality of terminals, the remote node being configured to combine the optical signals at the channel wavelengths and configured to separate the aggregate WDM optical signal.

17. The WDM-PON of claim 15 wherein the incident angle is in a range of about 3 to 4.5 degrees.

18. The WDM-PON of claim 15 wherein the predefine pitch of the dual core optical fiber pigtail is in a range of about 170 to 250 μm, and wherein the GRIN lens has a pitch in a range of about 0.21 to 0.25.

19. The WDM-PON of claim 15 wherein an unusable wavelength range between the C-band wavelength range passed by the WDM filter and the L-band wavelength range reflected by the WDM filter is less than 10 nm.

20. The WDM-PON of claim 15 wherein the transmitter and receiver sub-assemblies are configured to transmit and receive optical signals on more than 32 channels in both the C-band wavelength range and the L-band wavelength range.

\* \* \* \* \*